S. Cope,
Cheese Press,
N° 23,352. Patented Mar. 29, 1859.
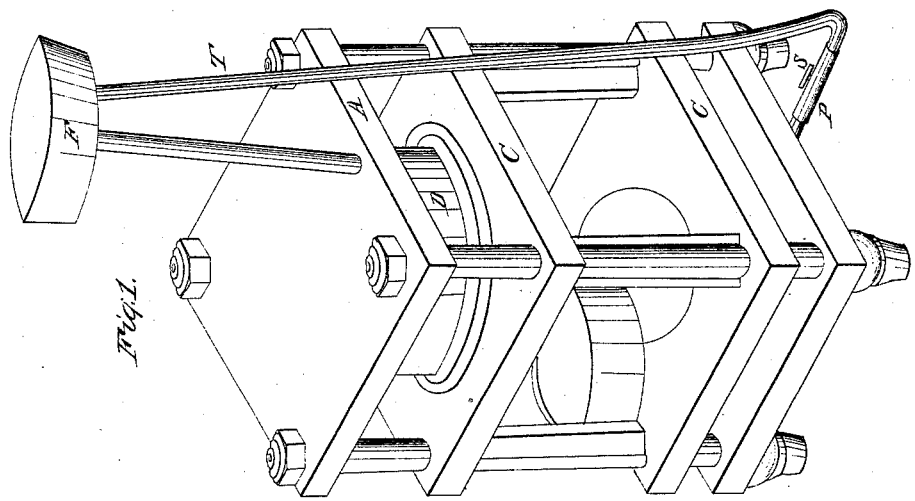
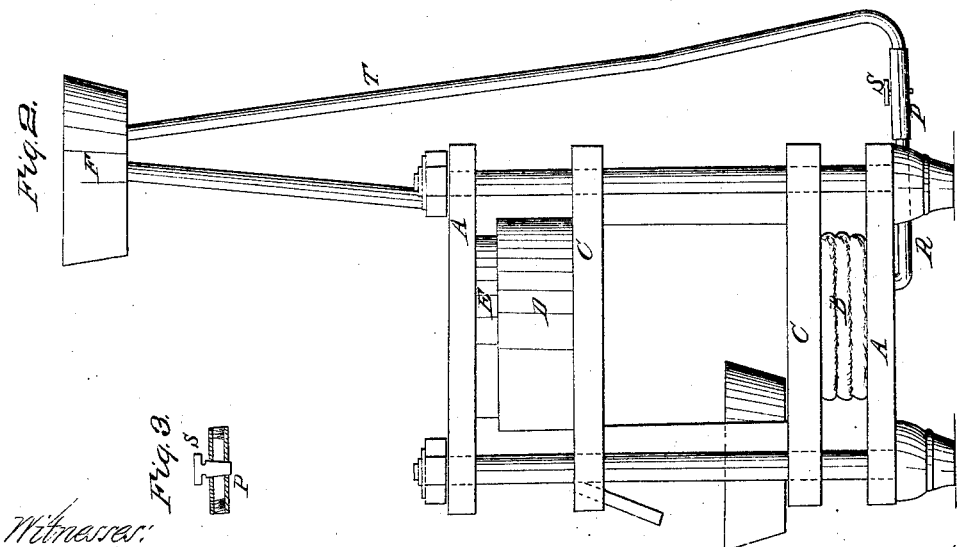
Witnesses:
Mary Sondell
A. Arnold
Inventor:
Samuel Cope

UNITED STATES PATENT OFFICE.

SAMUEL COPE, OF ENTERPRISE, ILLINOIS.

CHEESE-PRESS.

Specification of Letters Patent No. 23,352, dated March 29, 1859.

*To all whom it may concern:*

Be it known that I, SAMUEL COPE, of Enterprise, Wayne county, in the State of Illinois, have invented a new and useful Improvement in Cheese-Presses; and I hereby declare the following to be a full and clear description thereof, reference being had to the drawings herewith presented, which drawings constitute a part of said description.

The object of my improvement is to produce a more convenient press, and more perfectly to perform the operation of pressing.

It is a fact not perhaps generally understood, that in order to preserve the richness of the cheese, the operations of breaking, cutting and pressing, should be done in a gentle manner, carefully avoiding sudden or violent agitation, as all harsh movement and sudden pressing tends to separate the richness of the cheese, and to reduce the value and flavor thereof. See drawings.

Figure 1, shows an isometrical view of the whole press. Fig. 2, is a side view showing the several parts.

A is the frame.

B is a hydrostatic bellows, which lifts the platform C, on which the cheese vat D, is placed.

E, is a block fixed on the under side of the upper part of the frame A, and presses down upon the follower of the vat.

It may be observed that water placed in the reservoir F, is conveyed down through the tube T, and enters the bottom of the bellows. The reservoir is placed six or eight feet high more or less according to the intensity of pressure required. A stopcock S, is placed in the connecting pipe P, by which the water is kept back until it is requisite to let on the pressure. And it is then let on as gradually as we please, by turning the key S as little as may be required.

It is immaterial whether we use the bellows, or a cylinder and piston, but for cheapness, I prefer the bellows, either will produce the same effect.

Fig. 3. shows the connecting pipe P. This should be made with right and left screws in order to unite the two tubes T and R. And it has a key S, that can be slipped out when it is required to let out the water and lower down the press. The same purpose may be effected by using a three-wayed cock.

The principle of my improvement is putting on the pressure by slow degrees, gradually increasing the force by drawing the water as slowly through the tube as we please. By this means we find that the flavor and richness is preserved.

I do not claim a hydrostatic press, as that has been used for many purposes, but

What I claim is—

Graduating the force of a hydrostatic cheese press, by drawing the water slowly through the stop-cock S, as above described, for the purpose set forth.

In testimony whereof I hereto subscribe, in presence of two witnesses.

SAMUEL COPE.

Witnesses:
 MARY ARNOLD,
 A. ARNOLD.